United States Patent [19]
Meisinger

[11] Patent Number: 4,884,830
[45] Date of Patent: Dec. 5, 1989

[54] QUICK CONNECT COUPLING DEVICE
[75] Inventor: Stanlee W. Meisinger, Golden Valley, Minn.
[73] Assignee: FasTest, Inc., St. Paul, Minn.
[21] Appl. No.: 146,037
[22] Filed: Jan. 19, 1988
[51] Int. Cl.⁴ .......................................... F16L 21/04
[52] U.S. Cl. .................................... 285/94; 285/95; 285/102; 285/105; 285/323; 285/900
[58] Field of Search ................... 285/94, 95, 102, 101, 285/100, 105, 323, 900, 104

[56] References Cited
U.S. PATENT DOCUMENTS

| Re. 23,137 | 7/1949 | Hobbs . | |
|---|---|---|---|
| Re. 27,364 | 5/1972 | German . | |
| 2,253,932 | 8/1941 | Gilkerson | 285/94 |
| 2,485,976 | 10/1949 | Main . | |
| 2,494,598 | 1/1950 | Waring . | |
| 2,514,417 | 7/1950 | Roofe | 285/94 X |
| 2,712,458 | 7/1955 | Lipson . | |
| 2,810,592 | 10/1957 | Williams | 285/94 X |
| 2,819,733 | 1/1958 | Maisch . | |
| 3,127,149 | 3/1964 | Cruse . | |
| 3,164,361 | 1/1965 | Pruett . | |
| 3,291,152 | 12/1966 | Comer . | |
| 3,291,442 | 12/1966 | Cranage . | |
| 3,422,980 | 1/1969 | Richardson . | |
| 3,423,063 | 1/1969 | German . | |
| 3,505,846 | 4/1970 | Smida . | |
| 3,540,760 | 11/1970 | Miller et al. | 285/321 X |
| 3,713,204 | 1/1973 | Arnold | 285/101 X |
| 3,724,879 | 4/1973 | Snyder, Jr. | 285/101 |
| 3,727,952 | 4/1973 | Richardson | 285/101 |
| 3,738,688 | 6/1973 | Racine | 285/312 |
| 3,779,587 | 12/1973 | Racine | 285/312 |
| 3,799,207 | 3/1974 | Richardson et al. | 285/311 X |
| 3,813,751 | 6/1974 | Smida . | |
| 3,868,132 | 2/1975 | Racine | 285/312 |
| 3,962,769 | 6/1976 | Smida . | |
| 4,063,760 | 12/1977 | Moreiras | 285/321 X |
| 4,084,843 | 4/1978 | Gassert | 285/105 |
| 4,129,145 | 12/1978 | Wynn . | |
| 4,154,465 | 5/1979 | Van Meter | 285/312 |
| 4,189,162 | 2/1980 | Rasmussen . | |
| 4,225,159 | 9/1980 | Van Meter | 285/104 |
| 4,254,801 | 3/1981 | Gerthoffer et al. | 285/312 X |
| 4,326,407 | 4/1982 | Van Meter | 285/312 X |
| 4,345,783 | 8/1982 | Bergstrand | 285/346 X |
| 4,437,647 | 3/1984 | Cruse | 285/315 |
| 4,527,817 | 7/1985 | Persson | 285/101 X |
| 4,540,201 | 9/1985 | Richardson | 285/101 |
| 4,543,995 | 10/1985 | Weh et al. . | |
| 4,548,427 | 10/1985 | Press et al. | 285/321 X |
| 4,647,081 | 3/1987 | Landgraf et al. | 285/304 |
| 4,688,830 | 8/1987 | Meisinger et al. | 285/100 |
| 4,765,657 | 8/1988 | Cruse | 285/315 X |

FOREIGN PATENT DOCUMENTS

| 8702081 | 2/1987 | Fed. Rep. of Germany . | |
|---|---|---|---|
| 3639528 | 11/1987 | Fed. Rep. of Germany . | |
| 959700 | 6/1964 | United Kingdom | 285/95 |
| 996228 | 6/1965 | United Kingdom | 285/95 |

OTHER PUBLICATIONS

Tuthill "Quick-Seal" Test Plugs and Filling Connectors for Pressure Testing, dated 1978 (16 pg. brochure).
Ramer Test Tools, Inc. (copy of 28-page brochure identified as Exhibit B).
Twistmate TM Hand Threaded Connectors, Caps and Plugs Save Time (copy of 4-page brochure).
Sealing Threads, Pipes and Ports: FasTest TM.
Production Control Units, Inc.—Disassembly/Assembly Instructions for Field Servicing and Storing of "TQC" Coupler-Series 500861, 5010561, 501261.
PCU-product bulletin 122R—Quick Connect Process Couplings.
Ramer Test Tools, Inc. (18-page brochure).
Ramer Products, Inc. (10-page brochure).

Primary Examiner—Thomas F. Callaghan
Attorney, Agent, or Firm—Merchant, Gould, Smith, Edell, Welter & Schmidt

[57] ABSTRACT

A pressure balanced coupling device for quick connection and disconnection with at least one mechanism. The device operates to maintain a sealed flow-through connection between two devices which may also contain a pressurized medium such as refrigerants. The preferred device permits non-destructive gripping of tubing while affording readily selectable means for safely releasing pressure from within the device prior to releasing the gripping connection provided by this coupling device.

25 Claims, 3 Drawing Sheets

QUICK CONNECT COUPLING DEVICE

FIELD OF THE INVENTION

The present invention concerns coupling devices, and in particular a device for quick coupling of mechanisms which may also require sealed connections for a pressurized medium.

BACKGROUND OF THE INVENTION

Within the field of pressure testing devices, there exists a need for accurate, safe, and reliable connection and testing equipment. Generally, such devices provide connection between two tubings or test fittings. Frequently these fittings are designed to convey pressurized fluids and gases. Often the users of connection and test equipment are exposed to dangerous situations such as high pressure leaks, improper fastening of equipment to high pressure sources, resulting in rapid and unexpected separation of fittings, inaccurate test results, as well as others. Frequently individuals using test fittings, test plugs and the like do not realize the dangers inherent with improper equipment and connections. Moreover, it is often difficult to discern that a test fitting or test plug is improper for the intended use until an undesirable event has occurred. Also, an accurate determination of safe internal pressures prior to attempting a disconnection of pressurized couplings is not generally available in quick connect fittings.

A variety of test equipment and connector couplings have evolved. It should be noted that equipment in the pressure testing field includes equipment which must function with pressurized mediums such as water, refrigerants, oil, and air. The range of equipment therefore includes devices which are generally tested for toughness, reliability, ease of connection, and other important characteristics. Ideally, a test fitting connection device should also provide a safe and positive means for containing various pressures and vacuums of the test medium. It is for the above reasons as well as others that the costs associated with many types of test connections, fittings, and other related equipment are relatively expensive.

The devices of the prior art generally focus on achieving a firm clamp or grip on a test pressure source mechanism and a test pressure destination mechanism by means of a test connector or coupling device. Many such devices provide clamping means for tubing that is attached or inserted within the pressure source and destination mechanisms. The coupling devices connect the pressure source and pressure destination mechanisms to achieve flow-through of a medium for testing or other purposes. Means of attaching the source and destination tubing include: levers or cams which crimp down on the inserted tubing; threaded fittings; pressure activated rams which directly interface with collet type mechanisms; internally inserted engaging pawls; as well as other mechanical connections. In many instances spring biased arrangements are combined with pneumatic and mechanical means to effect seals on test fitting devices such as tubing.

Many prior art devices engage and initially grip the tubing and other test fitting connection means with a mechanical method that crimps or pinches the source or destination tubing. Such crimping, pinching, and other attaching means causes striations, nicks, grooves, and other distortions and damage to the tubing and test connections. This is frequently caused by coupling and testing devices which only allow for close tolerances for various pipe outer diameters. Accordingly, when connected to rough tolerances or varying diameters the excessive crimping and latching onto inserted tubing often results in significant damage to that tubing. Alternatively, inadequate crimping may result in undesired ejection of the tubing from the coupling device.

Some pressure testing devices utilize the pressure of the pressure source to enhance the gripping and sealing of the connections with the pressure destination tubing. This, too, is a problem in the prior art in that increased pressure from a test pressure source may impart excess pinching effect, through various collet and other mechanisms, and result in damage to inserted tubing, test fittings and shortened seal life of coupling device seals. This damage is similar to the problems described above relating to the mechanically derived clamping mechanisms. A problem related to pressure enhanced, that is, unbalanced, couplings is that movement of the inserted test fittings is caused by the force of the pressurized medium acting on a load enhancing piston which forces against the inserted test fittings; the force applied by the load enhancing piston against the test fitting varying in accordance with the pressure of the pressurized medium. This movement then causes gouges and striations to be created on that fitting or tubing by the clamping mechanisms. Similarly, coupling devices in which a tubing is inserted into contact with a movable piston may cause undesirable longitudinal movement of the tubing as pressure is applied to the piston.

Other problems exist in coupling devices which are not internally balanced. That is, in devices which include unbalanced components in pressurized operation, there exists a significant wear and component failure problem. Such problems may create substantial inefficiencies and dangerous operational conditions. Moreover, such devices generally do not provide readily operable means for exhausting or releasing internal pressure prior to disconnection.

Accordingly, there still exists a need to provide a coupling device which includes: a pressure balanced actuator means; means for sealing the coupling device in order to contain a pressurized medium; means for safely and securely gripping pressure source and destination fittings; means for securely attaching and using pressure testing fittings to source and destination pressure fittings without imparting damage to any of the attached components; and means for safely and readily bleeding off pressurized air, or another pressurized medium, which is within the pressure testing fittings prior to disconnecting the coupling device.

What has been further needed has been a pressure testing coupling device which: allows insertion, connection, and pressurized use of test fittings without damage; permits varied tolerances for varied outer diameters of test fittings; is durable and requires low maintenance; provides easy replacement of parts; requires only a minimum level of training to properly operate and maintain; is capable of operating accurately and safely under both high pressure and low pressure conditions; is balanced to reduce the stress on seals and other internal components; and is balanced to provide ease of manual pressure release.

These and other problems are solved by the present invention. Yet other objects and advantages will become apparent from the following descriptions, taken in connection with the accompanying drawings wherein are set forth by way of illustration certain embodiments of the present invention.

SUMMARY OF THE INVENTION

A device is provided to facilitate the coupling of a first mechanism with a second mechanism. More specifically, the device is operable to assist in relatively safe and non-destructive coupling between a pressure source mechanism and a pressure destination mechanism. The pressure source mechanism and the pressure destination mechanism are often in the form of tubing. In particular, the device is selectively operable to provide sealed flow-through communication of a pressurized medium between a pressure source and a pressure destination. The device is particularly well suited for coupling pressure or vacuum lines to tubing or piping. Such connections are often found in applications relating to pneumatic pressure devices, such as in the fields of refrigeration and gas storage facilities. The device may also be used to provide quick coupling means for mechanisms not containing a pressurized medium.

Devices according to the present invention include: a body member constructed to receive at least one pressure source connection and at least one pressure destination connection; a plurality of apertures located radially around the body member; a plurality of actuating balls positioned within the radially located apertures; a chamber located within the body member; and a biasing means constructed and arranged within the chamber to provide a constant biasing force for selective engagement with an actuator member; a means for providing a pressure seal; and a means for non-destructively gripping pressure destination tubing or piping. Preferably, the biasing means is constructed and arranged so that when the chamber of the coupling device is pressurized, the biasing means allows greater gripping engagement of the destination pressure source tubing within the coupling device, but also does not cause any longitudinal movement of the pressure destination tubing so as to avoid damage to that tubing or piping. It will be understood from the detailed descriptions that the balanced actuator mechanism of the present invention is particularly well adapted for this, since it applies a constant force to the sealing and gripping mechanisms, regardless of pressure level, while at the same time facilitating a means for relieving internal pressure prior to disconnecting.

A coupling device according to the present invention includes a means for readily and selectively depressurizing the chamber while the pressure source and pressure destination tubing are still connected to the coupling device. A major advantage of this depressurizing means is the added safety provided to users of this coupling device. This added protection extends to nearby personnel and equipment as well. Also, it is possible, although not preferable, to include a plurality of pressure source connections and pressure destination connections on a coupling device of this invention. It is also possible to utilize this coupling device to create a capped fitting or sealing plug on a pressurized tube.

Preferred embodiments of this invention include an elongated body member with first and second ends. The second end is designed and constructed to receive a pressure source mechanism. A first end is provided, which is substantially opposite the second end, and which is designed and constructed to receive a pressure destination mechanism. Pressure source and destination mechanisms include such devices as piping, tubing, and the like. The second end of a preferred embodiment includes a threaded fixture which provides threaded engagement with a desired pressure source. Such threaded engagement is preferable, although not necessary to achieve some of the advantages of this invention. The coupling device first end, which is designed to receive a pressure destination mechanism, is constructed to receive tubing which has been inserted into the body member chamber. It is generally desirable to utilize a tubing which is constructed of a material in the shape of a cylinder with a substantially circular cross section. This construction allows proper engagement, sealing, and gripping by the internal components of this coupling device onto the tubing. Alternate embodiments of this invention may include non-circular shaped engaging portions which would be in accordance with the present invention and achieve the same advantages.

The biasing means of the preferred device comprises: a spring mechanism which is longitudinally disposed within the chamber of the body member; an actuator member which is also longitudinally disposed within the chamber, and which is selectively movable between a first position and a second position, and has a bore which extends therethrough; a sleeve mechanism which is substantially located external to the chamber of this device; and an engaging mechanism which is constructed and arranged to retainably engage the tubing of the pressure destination mechanism.

This biasing means provides a coupling device capable of locked mechanical engagement of an inserted tubing when the tubing is inserted in the chamber of the coupling device and the biasing means is selectively operated to engage that tubing. Selective operation of the coupling device is achieved by longitudinal movement of an external sleeve member between a first position and a second position. The first position of the sleeve member generally corresponds to placement of the sleeve member, in this preferred embodiment, near the pressure source end of the coupling device. The second position of the sleeve member generally corresponds to a location near the pressure destination end of a preferred device.

When the sleeve member is in the second position, the mechanical engaging means is in a locked open position which allows for insertion of a length of tubing into the coupling device chamber. In this preferred embodiment, the tubing is a pressure destination tubing. When the tubing is inserted into the chamber, the tubing contacts a generally immobile stop means and is stopped. The tubing may then be mechanically locked in place by longitudinal movement of the external sleeve member from the second position to the first position. When the sleeve member is in the first position, it is easily rotated about the body member. However, when the sleeve member is in the second position, it is substantially prevented from rotation due to frictional contact of the sleeve member with portions of the body member and the actuating balls. The orientation of the sleeve mechanism could be changed in the longitudinal direction to provide similar engagement with actuating balls, without degrading the advantages of this invention. It is also desirable, although not required, that the locked-open position of the external sleeve member correspond closely to the chamber opening so as to facilitate the use of this device with only one hand.

The coupling device according to the preferred embodiment includes a spring mechanism. Preferably the spring mechanism includes a substantially noncompressible inner spring which has a first end located approximately at the end of the chamber corresponding to the pressure source end. This spring mechanism also has a second end which is constructed and positioned for contact with piping that has been inserted into the chamber at the chamber first end. This inner spring is designed to provide a stop means for tubing or piping which is inserted into the chamber of this coupling device. A major advantage of this inner spring stop means is the independent relation of the stop means to any longitudinal biasing effect acting upon inserted tubing. That is, this stop means is designed to provide a secure stop for placement of the tubing within the coupling device but will not impart any longitudinal movement to the piping during either pressurized or nonpressurized operation.

This coupling device spring mechanism also contains an outer spring with a first end located approximately near the second end of the body member. An outer spring second end is located substantially opposite the outer spring first end. This outer spring second end provides biasing means in a generally longitudinal direction against the actuating mechanism. This biasing force provides the minimum engaging force to grip and retain a pressure tubing or piping in this coupling device chamber. It will be understood, as illustrated in more detailed descriptions, that this engaging force will be enhanced by pressurizing the body member chamber. Generally, the amount of enhanced engaging force applied to tubing which is inserted in this coupling device increases and decreases in relation to the pressure of a pressurized medium within the chamber; however, this is achieved while maintaining a pressure balanced actuator member that merely functions as a trip mechanism for an initial gripping and sealing force rather than for enhancing such engaging forces in pressurized operation.

Preferred coupling devices according to this invention may also include spring mechanisms which are comprised of: a substantially non-compressible inner spring which extends substantially throughout the entire length of an actuator mechanism; a double acting spring having generally rigid inner coils and flexible outer coils; as well as other forms of multiple biasing and stop means.

Many tube and pipe connectors include actuator type mechanisms which substantially protrude from these connectors. The protrusions may cause numerous problems such as: susceptibility of the actuator to damage from dropping or impacting with other objects; inadvertent activation or movement imparted to the actuator; inaccurate position indications due to improper mounting of these actuators; as well as others. The coupling device of the present invention includes a sleeve mechanism which surrounds a selectable portion of the elongate body member, and is generally conformal with this coupling device, rather than shaped as a protrusion extending from the body member. This sleeve mechanism includes: a sleeve member and an external retaining ring. Preferably, the sleeve member has a first face which is substantially parallel to the body member of this coupling device; and a ramped second face which is constructed to provide an angled surface in relation to the surface of the elongate body member. The sleeve member is designed for selective longitudinal movement on the coupling device body member between a first position and a second position.

In a preferred device, the sleeve member first position allows the biasing means within the chamber to bias an actuator mechanism to engage tubing or piping which is inserted in the chamber. The sleeve member second position allows depressurization of the chamber while retaining the tubing in locked engagement therein. Once the chamber pressure is substantially equivalent to the ambient pressure outside the body member, the sleeve member second position allows for removal of the tubing or piping inserted within the chamber. The external retaining ring provides a longitudinal stop means for the sleeve member. Other stop means such as lips, engaging notches and the like may also be used.

A preferred device according to this invention includes a chamber with a biasing means providing a biasing force against an actuator mechanism to urge sealing engagement with tubing or piping inserted within the chamber. An actuator mechanism in a preferred device includes an actuator member, and an actuator seal. The actuator member includes a first end located substantially longitudinally opposite a second end, with a recessed or grooved portion located between the first and second ends. More specifically, the actuator member comprises an actuator first end constructed and designed to receive a second end of an outer spring or biasing means so as to provide a biasing force generally in the direction of the actuator second end. The actuator seal, preferably located substantially in the actuator member, is preferably located near the actuator first end. This actuator seal is constructed and designed to provide a pressure stop between an actuator member and a chamber wall. A preferred construction includes an actuator seal having at least two annular elastomeric seals. These seals are preferably located within elongate grooves in the actuator member. Also, grease or other lubrication may be placed in association with the seals to provide enhanced sealing between the chamber wall and the actuator member. This actuator seal construction is particularly effective in pressurized environments within the chamber; the actuator seal functioning to prevent blow-by of a pressurized medium beyond the seal, to prevent contaminants from damaging the sealing effect, to provide lubrication, and to facilitate balancing of the actuator member.

An actuator member second end is constructed and designed to: provide longitudinal force against an annular elastomeric seal; compress a portion of the seal against a washer; permit the seal to distend so as to engage the chamber wall in sealing contact; and to permit the seal to distend and re-shape so as to provide sealing and gripping contact between the seal and the inserted tubing. The actuator is principally balanced by providing for contact of the actuator second end with a diameter of the annular elastomeric seal which is essentially the same diameter as the actuator first end sealing contact.

Certain substantial advantages attach to this device due to its balanced actuator member. One major advantage of a balanced actuator member is that it provides a readily selectable means for moving the external sleeve from a pressurized to a de-pressurized position. This allows de-pressurizing of the chamber prior to release of the gripping engagement of any inserted tubing or other mechanism.

A coupling device according to the present invention includes an engaging mechanism comprising: a multi-element collet; an annular elastomeric seal; and an annular washer. In a preferred device, the collet has a first side which is positioned for gripping engagement with a piping or tubing which is inserted in a chamber. This first side also has an indented portion wherein a spring ring is inserted to provide a radially directed force against the split collet in the direction of the chamber wall. Therefore, when the coupling device sleeve member is positioned to allow insertion of tubing or piping into the chamber, this spring ring maintains the collet in an open, receiving position. The collet includes a second side which is located substantially opposite the first, gripping side. The second side has a ramped shape designed for movable engagement with a collet retaining ring. The collet includes a third side which is oriented toward the pressure source end of the body member and which is designed for abutting relationship with an annular washer.

The annular elastomeric seal is constructed and positioned to impart a substantially radially oriented force to the outer diameter of the tubing or piping which has been designated, by insertion into the chamber, for engagement. The annular elastomeric seal also spreads radially into contact with the chamber wall.

An annular washer is positioned between the annular elastomeric seal and the multi-element collet to transfer longitudinal biasing force to the gripping collet. When such longitudinal pressure is transferred from the annular washer to the third side of the collet, the ramped second side of the collet engages the collet retaining ring to provide longitudinal as well as radial movement of the collet. This movement results in gripping engagement by the collet onto the piping or tubing. In this manner, a quick connecting collet gripping engagement is achieved between a coupling device and a tubing or piping inserted therein. Further, the above described annular elastomeric seal, in conjunction with the force of any pressurized medium acting upon it, provides added gripping engagement of inserted piping or tubing as well as preventing any significant longitudinal movement and damage to that piping or tubing. The shape and construction of the actuator mechanism also enhances the radially oriented force which is transferred to the inserted piping, thereby further protecting that piping from longitudinal movement and probable damage.

When a pressure test is desired to be accomplished using a coupling device according to this invention, a first pressure mechanism, or pressure source, is attached to the pressure source end of the body member of this coupling device. In a preferred embodiment, that attachment means includes a threaded engagement. The sleeve member is then positioned in a second position approximately near the receiving end of this coupling device body member. With the sleeve in this position, the sleeve member contacts a plurality of retaining balls located in the body member retaining ball apertures. This contact maintains the position of the retaining balls within the notched portion of the actuator member, thereby preventing the biasing means from urging the actuator member longitudinally in the direction of the receiving end of the chamber. Accordingly, the annular elastomeric seal and the collet gripping and engaging means remain ready for insertion of piping or tubing within the chamber. In this unpressurized, receiving configuration, the body member of this coupling device is receptive to insertion of a tubing or piping therein.

Preferably a pressure destination tubing is in the shape of a longitudinal material such as metallic or plastic piping or tubing. This piping or tubing should preferably have a circular cross section so as to enhance the seal thereon in a preferred embodiment of this device. The designated piping is inserted into the first end of the body member until the piping is stopped by contact with a generally non-compressible portion of the spring mechanism. In this device, the inner spring provides such a stop means. A secure gripping engagement may be achieved between the coupling device and the inserted tubing by selectively moving the sleeve member from the second position to the first position. During this longitudinal movement of the sleeve member from the second position to the first position, the sleeve member ramped second end allows the actuating balls to emerge from the notched portion of the actuator member substantially through the body member radial apertures. As the retaining balls emerge from the apertures, the actuator member is allowed to move longitudinally in the direction of the body member first, or gripping, end. The actuator is urged longitudinally by the force of the biasing means in the chamber. Preferably, the biasing means include a spring mechanism providing constant biasing force against the first end of the actuator member. The biasing force moves the actuator into compressing engagement with the annular elastomeric seal. The construction of the actuator member second end and the annular washer allows the seal to reshape and engage the tubing inserted within the chamber as well as to engage the chamber wall. The reshaped seal imparts radially oriented force against the inserted tubing. Moreover, when a pressurized medium is within the chamber, the annular elastomeric seal encourages even greater radially oriented gripping force on the tubing.

The drawings constitute a part of this specification and include exemplary embodiments of the present invention, while illustrating various objects and features thereof. It will be understood that in some instances relative material thicknesses and relative component sizes may be shown exaggerated, to facilitate an understanding of the invention.

BRIEF DESCRIPTION OF THE DRAWINGS

In the drawings, in which like referenced numerals indicate corresponding parts throughout the several views.

DETAILED DESCRIPTION OF THE PREFERRED EMBODIMENT OF THE INVENTION

As required, detailed embodiments of the present invention are disclosed herein. It is to be understood, however, that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed system or structure.

Figure 1:
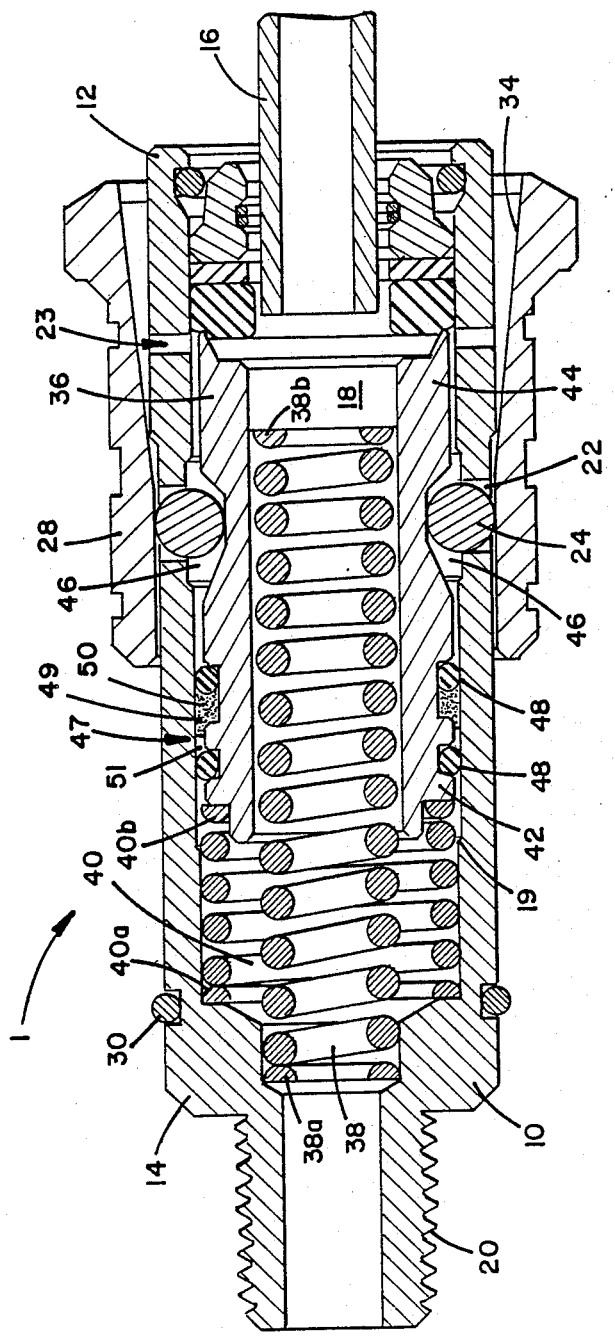
FIG. 1 is an environmental longitudinal cross-sectional view of this coupling device, showing the device according to the present invention oriented for coupling to a threaded pressure source and for receiving a pressure destination tubing; the tubing being shown in a partially inserted position.

Referring to FIG. 1, reference numeral 1 generally designates a device according to the present invention. In FIG. 1, the coupling device 1 is shown in a typical environment for use. Specifically, in FIG. 1 a body member 10 of the present invention includes a first end 12 and a second end 14. A pressure source may be attached to second end 14 and a tubing 16, generally a pressure destination mechanism, may be inserted within body member 10. The coupling device 10 contains a cavity therein which defines a chamber 18; the chamber 18 extending substantially the entire longitudinal length of body member 10. Chamber 18, defined by chamber wall 19, allows flow-through communication of a pressurized medium from a pressure source attached to the body member second end 14 through chamber 18 and into the pressure destination mechanism tubing 16. It will be understood that the coupling device 1 may be utilized in a variety of environments, the environment of FIG. 1 being representational only. Specifically, body member 10 is shown comprising only one pressure source connection and one pressure destination mechanism connection corresponding generally to body member second end 14 and first end 12 respectively. A plurality of such connections may be applied to this coupling device. Moreover, means for attaching a pressure source to this coupling device include a variety of manners. Preferably, a threaded engagement 20 is provided, however, other means may be utilized without substantially affecting the major advantages of this invention.

When a connection is required between two fittings, such as between pressure source and pressure destination mechanisms, a coupling device may be used to provide that connection. Not all such connections require a permanent coupling device and therefore there is a need for devices which require only a short time to connect and disconnect. Often a high pressure medium is being worked with, and is a gas of some type. Coupling device 1 of the present invention is particularly well suited to such a coupling application. It will be understood however that device 1 according to the present invention may be utilized in a variety of applications, including the coupling or capping of mechanisms which contain pressurized fluids, aerosols, and other mediums. Similarly, a variety of coupling devices according to the present invention, but of different sizes, lengths, construction materials, shapes, etc., may be involved in the coupling application in which device 1 according to the present invention can be used. Moreover, coupling device 1 also provides rapid connection and disconnection of mechanisms which do not contain pressurized media, and therefore may be utilized in various environments for numerous applications.

Traditionally, devices which provided relatively quick connection between pressurized and unpressurized volumes included many problems. A major problem was achieving a proper seal so as to prevent leakage of a pressurized material from within the connection. A common solution to this leakage problem was to provide greater tightening force onto connection points of the devices. The biasing force from the pressurized medium was used to impart additional sealing effects on various components within such devices to achieve greater tightening force.

However, devices, which provide connection between a pressure source and a pressure destination mechanism routinely impart damage to the pressure destination mechanism. This damage results from utilizing the pressurized medium to enhance the sealing effect on the pressure destination mechanism, or tubing, without solving the problem of longitudinal movement imparted to that pressure destination tubing. When such longitudinal movement occurs, the tubing receives striations, gouges, and other structural distortions. These distortions and deficiencies may impart weakness areas to the tubing and create further difficulties of various types. Coupling device 1 of the present invention overcomes the sealing and damage problems of the prior art by providing sealing engagement for pressure source and pressure destination mechanisms with components that are constructed and arranged to provide balanced actuating means for radially directing a gripping force onto a pressure destination mechanism tubing 16. The radial gripping force and generally radially oriented sealing means aids in avoiding the previously noted damage problems related to longitudinal movement of tubing.

The coupling device 1 is selectively operable to receive a pipe or tubing 16 in body member 10 first end 12. Referring to FIG. 1, coupling device 1 receives tubing 16 inserted in chamber 18. The coupling device body member 10 includes a plurality of radially oriented apertures 22 with a certain diameter. Other apertures 23 are also provided. Within each aperture 22 there is an actuating ball 24 which moves radially within each aperture. In operation, the actuating balls 24 are selectively moved from a first position located substantially within the coupling device body member and chamber, and a second position at which each actuating ball 24 may be substantially external to the body member. The position of each of the substantially round actuating balls 24 is determined by the operation of a sleeve mechanism. Apertures 23 are provided to facilitate the selective venting of a pressurized chamber 18.

Figure 2:
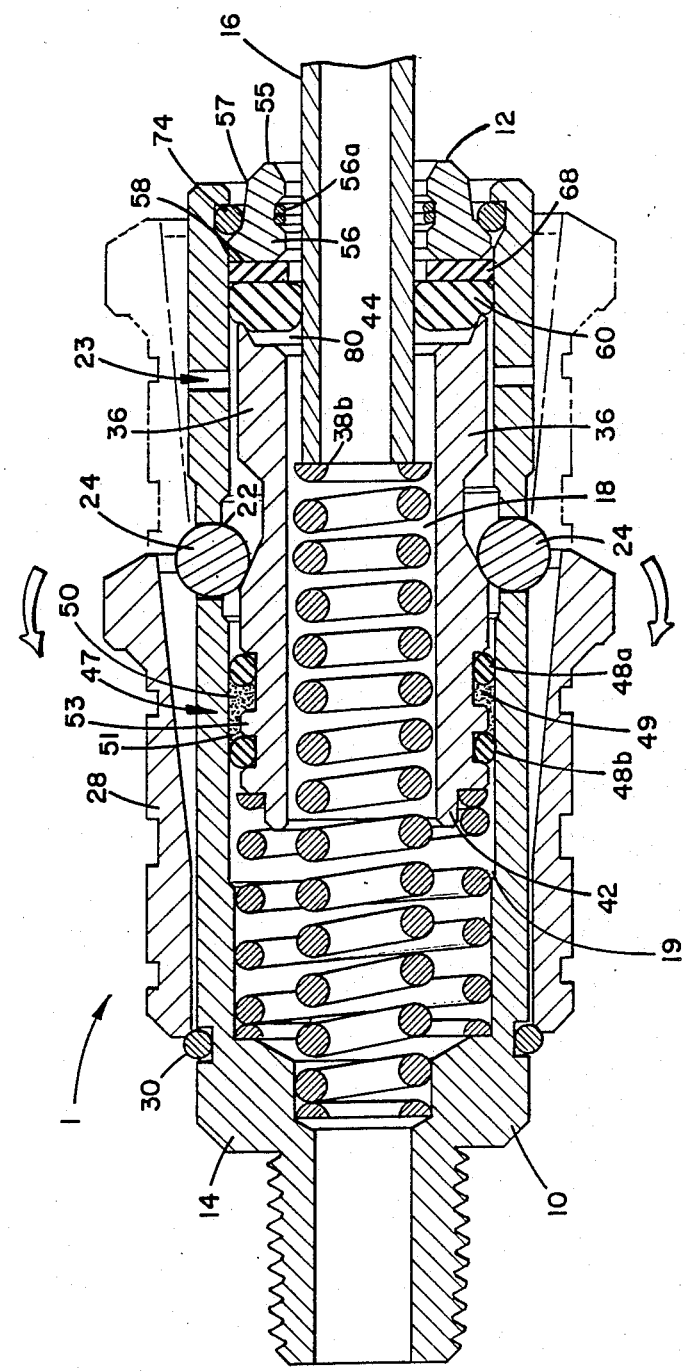
FIG. 2 is an environmental longitudinal cross-sectional view of a coupling device according to the present invention shown in operation sealably engaging a tubing; the internal chamber of the device being pressurized with a pressurized medium; and with the sleeve member and other components positioned for engaging the pressure destination tubing within the coupling device.
Figure 3:
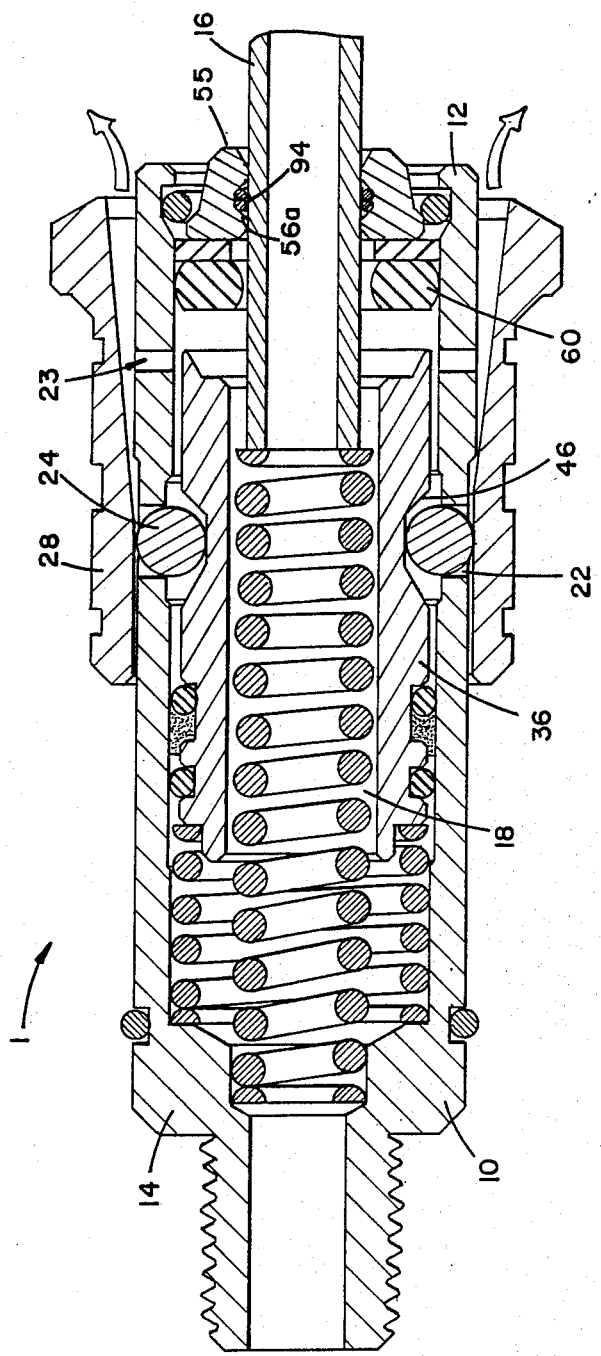
FIG. 3 is an environmental longitudinal cross-sectional view generally corresponding to the view shown in FIG. 2, but with the sleeve member positioned in a depressurizing orientation with the body member of this coupling device; and with only the collet providing engagement with the tubing within the chamber.

The sleeve mechanism of a preferred device includes a sleeve member 28, and an external retaining ring 30. Sleeve member 28 is constructed and arranged to encircle a portion of the elongate body member 10 and be capable of selective longitudinal movement on said body member between a first and second position. Sleeve member 28 first position corresponds generally to sleeve member 28 being located near the external retaining ring 30, as shown in FIG. 2. Alternatively, sleeve member 28 may be in a second position, as in FIG. 1, which corresponds to the coupling device 1 allowing insertion of a tubing 16 therein. Sleeve member 28 second position also provides for internal chamber 18 to be in a depressurized or depressurizing condition, as illustrated in FIG. 3.

Sleeve member 28 is comprised of a first face 32 which is oriented generally parallel with the plane of body member 10; and an angled second face 34. When sleeve member 28 is positioned to allow tubing 16 to be inserted into chamber 18, the sleeve member first face 32 is in engagement with actuating balls 24; providing radially directed force to actuating balls 24 which maintains the actuating balls substantially within the body member apertures 22.

A coupling device according to the present invention includes a biasing means which urges components of the device into engaging contact with the tubing 16. Preferably, a biasing means includes a spring mechanism. A biasing means is designed for cooperation with actuator member 36, actuating balls 24, and sleeve member 28 to allow selective gripping and sealing of tubing 16 inserted into coupling device 1. An engaging mechanism is constructed and arranged to transfer the force of the biasing means and actuator member into gripping engagement with tubing 16.

Although some variation in type and shape of biasing means is possible, a preferred device includes a spring mechanism which is longitudinally disposed within chamber 18. The spring mechanism may include a plurality of individual springs or a multiple acting single spring with varied coil configurations. A preferred arrangement for a spring mechanism includes an inner spring 38 and an outer spring 40. Inner spring 38 has a first end 38$a$ located proximate to second end 14 of body member 10 in chamber 18. The inner spring second end 38$b$ is located generally near first end 12 of body member 10 inner chamber 18. Inner spring second end 38$b$ is positioned for abutting contact with a pressure destination mechanism, or tubing 16, which in FIG. 1 is partially inserted into chamber 18. Inner spring 38 is generally non-compressible so as not to impart any longitudinal movement to an inserted tubing. Inner spring 38 provides a stop means which is generally independent from any mechanical biasing force within device 1. Inner spring second end 38b may also be constructed from another form of resilient stop means. A biasing means spring mechanism preferably contains an outer spring 40 with a first end 40$a$ also located approximately at second end 14 of body member 10 inner chamber 18. An outer spring second end 40$b$ is positioned in biasing contact with a portion of actuator member 36.

The contact of outer spring second end 40$b$ with actuator member 36 provides biasing force against actuator member 36 in a generally longitudinal direction from body member second end 14 towards body member first end 12. Accordingly, when sleeve member 28 is repositioned from its second position, shown in FIG. 1, to its first position, shown in FIG. 2, actuating balls 24 are no longer retained within apertures 22 by sleeve member 28 first face 32. Due to the biasing force of outer spring 40 on actuator member 36, actuating balls 24 are urged radially away from inner chamber 18 towards the angled second face 34 of sleeve member 28; sleeve member angled face 34 then being positioned proximately over apertures 22 and allowing greater room for actuating balls 24 to substantially emerge from apertures 22. As each actuating ball 24 moves radially outwardly in relation to chamber wall 19, actuator member 36 urges a rapid projection of each actuating ball in a radial direction away from chamber 18. The biasing means then further urges actuator member 36 in a longitudinal direction toward body member first end 12.

Preferably, actuator member 36 is constructed of an elongate member designed for selectively moving longitudinally within a chamber 18 and with a central bore extending longitudinally therethrough. More particularly, an actuator member 36 in a device according to the present invention has a first end 42 located substantially longitudinally opposite a second end 44, and a notched portion 46 located between first end 42 and the second end 44.

An actuator sealing portion 47 is preferably located near actuator first end 42. Actuator sealing portion 47 is constructed and designed to provide a fluid-type seal or pressure stop between actuator member 36 and chamber wall 19.

Although actuator sealing portion 47 needs at least on annular elastomeric seal 48, a preferred construction includes two annular elastomeric seals 48. Lubricating material 49, such as high vacuum silicon grease, solvent resistant grease, and other lubricating materials, is preferably provided for lubrication of the coupling device chamber wall 19 and the actuator member 36 exterior surface in the region between the actuator sealing portion seals 48. In a preferred coupling device, seals 48 are recessed in a first groove 50 and a second groove 51. Actuator sealing portion 47 may have first groove 50 and/or second groove 51 recessed within actuator member 36, as depicted in FIGS. 1-3, or within chamber wall 19. Further, lubricating means 49 is preferably formed in a reservoir within first groove 50 and between seals 48.

In operation, as shown in FIG. 2, seals 48 function as a leading seal 48$a$ positioned within first groove 50 and a following seal 48$b$ positioned within second groove 51. Accordingly, when actuator member 36 moves axially within coupling device 1 toward chamber first end 12, leading seal 48$a$ urges lubricating material 49 into contact with the areas of chamber wall 19 and actuator member 36 between seals 48$a$ and 48$b$. Actuator sealing portion 47 facilitates the axial movement of actuator member 36 as well as providing fluid-tight seal between actuator member 36 and chamber wall 19. Coupling device 1 includes a first groove 50 which is longer than second groove 51. First groove 50 is preferably separated from second groove 51 by a reservoir retaining member 53 which permits retention of substantially all of lubricating material 49 within first groove 50. The construction of actuator sealing portion 47 in a preferred coupling device is particularly advantageous in that lubricating material 49 is substantially protected from degradation due to contact with the fluid medium within coupling device 1. For example, refrigerants, solvents, or water may tend to degrade grease lubricating materials which are not specifically resistant to those respective mediums. Therefore, actuator sealing portion 47 of a preferred coupling device 1 provides additional protection for internal components as well as permitting device 1 to be used in various environments and with various mediums flowing therethrough.

Referring to FIG. 2, a coupling device according to the present invention is illustrated with sleeve member 28 positioned in the first, locked and/or pressurized, position. FIG. 2 illustrates the longitudinal movement of sleeve member 28 from the dotted load position to the locked and/or pressurize position. The load position corresponds generally to sleeve member 28 being located near the first end 12 of the body member 10, whereas the locked and/or pressurized position of sleeve member 28 corresponds generally with sleeve member 28 being located near second end 14 of body member 10. Once sleeve member 28 is no longer in engaging contact with actuating balls 24, sleeve member 28 may be rotated about body member 10 of coupling device 1. Further, sleeve member 28 may move longitudinally a certain distance in either direction until it contacts either the protruding actuating balls 24 or the protruding sleeve member retaining ring 30. These features of sleeve member 28 combine to provide at least one major advantage in that sleeve member 28 is difficult to inadvertently move from the first position to the second position when an engaging relationship exists between the coupling device and a tube or pipe which is inserted therein. This advantage is particularly important when a pressurized medium, possibly at high pressure, is within body member chamber 18. Sleeve member 28 generally requires intentional grasping to move it from the first pressurized position to the second depressurizing and/or releasing position. This feature minimizes the risk of inadvertent depressurization and release of this device through accidental jarring or bumping. Yet another advantage of the preferred sleeve member 28 construction is the significant safety provided by the sleeve functioning to deflect any pressurized medium exiting the chamber through apertures 22, or other similarly located vent apertures such as apertures 23, during the depressurize sequence. The feature essentially prevents a high pressure medium from endangering the eyes or other parts of a user's body or nearby items during venting of coupling device 1.

As noted hereinabove and depicted in FIG. 2, a biasing means provides longitudinal force to actuator member 36 which enables coupling device 1 to actuate gripping of and sealing of a pressure destination mechanism piping 16 which has been inserted into chamber 18 against stop means 38b. In a preferred device, an engaging mechanism is provided which includes a multi-element collet 55 having a first side 56 with an indented portion 56a, a second side 57 which is substantially opposite first side 56 and which is constructed of a ramp shape, and a third side 58 facing away from body member second end 14; an annular elastomeric seal 60, constructed and positioned to impart substantially radially oriented force to tubing 16; an annular washer 68 which provides means for transferring longitudinal force from annular elastomeric seal 60 to third side 58 of collet 55, and which functions to prevent portions of seal 60 from entering any gaps in collet 55; and a collet retaining ring 74. Other collet constructions may be provided which differ from a preferred collet but which retain some advantages of this invention.

Referring to FIG. 2, coupling device 1 in operation provides a biasing force against an actuating mechanism which then transfers that biasing force to an engaging mechanism for initially gripping and sealing tube 16 within chamber 18. In a preferred device, the actuator mechanism includes actuator member 36 having first end 42 constructed and designed to receive a biasing means which provides a biasing force generally in the longitudinal direction toward body member first end 12. Further, actuator member 36 has a second end 44 which is constructed and designed to: provide longitudinal force against annular elastomeric seal 60; compress a portion of seal 60 against washer 68; permit seal 60 to distend so as to engage chamber wall 19 in sealing contact; and permit seal 60 to distend and reshape so as provide sealing contact between seal 60 and tubing 16.

A coupling device in accordance with this invention provides a quick connection between coupling device 1 and tubing 16. Device 1 also causes seal 60 to be in sealing engagement with the outer diameter of tube 16 so as to aid in preventing longitudinal movement of tube 16 within chamber 18 after collet gripping means 55 engages tube 16. Generally, longitudinal movement of tubing or other devices which are in engagement with a collet gripping mechanism results in striations, cutting, and other damage to the tubing. Therefore, this invention provides mechanical advantage and other means resulting in a transfer of longitudinal biasing forces into substantially radially oriented gripping and sealing forces without inducing longitudinal movement of tube 16 which is inserted within coupling device 1. Also, as chamber 18 is pressurized, seal 60 augments collet 55 gripping forces by transferring force of the pressurized medium, and the initial longitudinal force of the biasing means, generally in a radially oriented direction toward the outer diameter of tubing 16.

As illustrated in FIG. 2, actuator member second end 44 is designed: to encourage substantial reshaping of seal 60; and, in cooperation with seal 60 and tubing 16, define a cavity 80. Cavity 80 allows seal 60 to expand around, and to sealingly engage the outer diameter of tubing 16. Cavity 80 also functions to increase the area of a pressurized medium at actuator member second end 44. Such an increased area facilitates the longitudinal balancing of actuator member 36; actuator member 36 serving only as a trip mechanism for initial gripping and sealing rather than for applying increased force for gripping or sealing as pressure in chamber 18 increases. Actuator member 36 is principally balanced by providing contact of actuator second end 44 with a diameter of annular elastomeric seal 60 which is essentially the same diameter as the actuator first end 42 sealing contact between actuator seal 47 and chamber wall 19. The net longitudinal effect of the forces on actuator member 36 due to biasing means, the pressurized medium, and seal contact are balanced so as not to urge the actuator member in either direction. However, an increase in the pressure of the pressurized medium would cause the engaging mechanism, including seal 60, washer 68, and the collet 55 to move in the gripping direction and thereby exert an increase in gripping force. A proportional decrease in gripping pressure is observed as the pressure of the pressurized medium is decreased.

Movement of sleeve member 28 from the first locked and/or pressurize position, illustrated in FIG. 2, to the second depressurize and/or load position is illustrated in FIG. 3. Such movement urges actuating balls 24 back into notched portion 46 of actuator member 36 while simultaneously providing longitudinal movement to actuator member 36 in the direction of body member second end 14. This configuration allows a pressure release path, when pressure exists within the chamber, between actuator member 36 and seal 60 so as to exhaust the pressurized medium through body member radial apertures 22, 23. Throughout the depressurization sequence, collet gripping means 55 remains engaged with tube 16 until the pressure in chamber 18 has decayed to a level which will not overcome the radial biasing force of collet spring ring 94, in a preferred device, located within collet first side indented portion 56a. When the pressure within chamber 18 has decayed to a sufficiently low level, tubing 16 may be withdrawn from chamber 18. An advantage is obtained from the engaging mechanism in that a pressurized medium within chamber 18 may be safely exhausted before tubing 16 may be disengaged from coupling device 1.

It is to be understood that while certain embodiments to the present invention have been illustrated as described, the invention is not to be limited to the specific forms or arrangement of parts herein described and shown.

What is claimed is:

1. A coupling device used in selectably coupling a first mechanism to a second mechanism in a fluid tight relationship wherein one of the first and second mechanisms provides a source of fluid pressure and the other a fluid pressure destination, the coupling comprising:

(a) a hollow body member having first and second ends and defining a fluid passageway interconnecting the first and second ends to enable the flow of fluid therethrough, the hollow body member having a wall portion with an interior surface defining a first chamber proximate the first end with an inside diameter sized to slideably receive the first mechanism, the hollow body member including at least one aperture extending through the wall portion and in communication with the first chamber;

(b) a gripping mechanism being disposed in the first chamber proximate the first end, the gripping mechanism being actuable between a first actuated state wherein the gripping mechanism grips the first mechanism and a second non-actuated state wherein the gripping mechanism does not grip the first mechanism;

(c) a cylindrical seal member disposed in the first chamber proximate the first end, said seal member being selectively positioned between a first sealing state and a second non-sealing state;

(d) an actuator means for selectively actuating the gripping mechanism between the actuated state and the non-actuated state, comprising:
(i) an actuator member disposed within the first chamber and axially slideable between a first position actuating the gripping mechanism and a second position nonactuating the gripping mechanism, the actuator member having an inner surface and an exterior surface;
(ii) biasing means for biasing the actuator member toward the first position;
(iii) retaining means for selectively positioning the actuator member in a first and second position, the actuator member being substantially balanced in the longitudinal direction when the fluid passageway is pressurized.

2. A coupling device according to claim 1 including means for deflecting a pressurized medium from venting radially beyond said wall portion apertures at high pressure.

3. A coupling device according to claim 1 comprising an actuator sealing portion providing a fluid-tight seal located between said actuator member and said body member chamber wall, near said body member second end, said actuator sealing portion including at least one annular elastomeric seal circumferentially surrounding said actuator member.

4. A coupling device according to claim 3 wherein said actuator sealing portion further comprises:
(a) two annular elastomeric seals;
(b) means for lubricating the chamber wall portion and the actuator member exterior surface located between said actuator sealing portion annular elastomeric seals.

5. A coupling device used in selectably coupling a first mechanism to a second mechanism in a fluid tight relationship wherein one of the first and second mechanisms provides a source of fluid pressure and the other a fluid pressure destination, the coupling comprising:

(a) a hollow body member having first and second ends and defining a fluid passageway interconnecting the first and second ends to enable the flow of fluid therethrough, the hollow body member having a wall portion with an interior surface defining a first chamber proximate the first end with an inside diameter sized to slideably receive the first mechanism, the hollow body member including at least one aperture extending through the wall portion and in communication with the first chamber;

(b) a gripping mechanism being disposed in the first chamber proximate the first end, the gripping mechanism being actuable between a first actuated state wherein the gripping mechanism grips the first mechanism and a second non-actuated state wherein the gripping mechanism does not grip the first mechanism;

(c) a cylindrical seal member disposed in the first chamber proximate the first end, said seal member being selectively positioned between a first sealing state and a second non-sealing state;

(d) an actuator means for selectively actuating the gripping mechanism between the actuated state and the non-actuated state, comprising:
(i) an actuator member disposed within the first chamber and axially slidable between a first position actuating the gripping mechanism and a second position non-actuating the gripping mechanism, the actuator member having an inner surface and an exterior surface;
(ii) biasing means for biasing the actuator member toward the first position;
(iii) retaining means for selectively positioning the actuator member in a first and second position, the retaining means comprising a ball member and a sleeve member, the sleeve member axially slidable between a first and second position and having an inner surface and an exterior surface, the sleeve member being externally mounted on the wall portion of the body member defining the first chamber and cooperating with the actuator member to retain the ball member at least partially in the aperture defined in the wall portion between the inner surface of the sleeve member and the exterior surface of the actuator member, the ball member cooperating with the biasing means and the sleeve member to selectively position the actuator member in the first and second positions, the actuator member being substantially balanced in the longitudinal direction when the fluid passageway is pressurized.

6. A coupling device used in selectably coupling a first mechanism to a second mechanism in a fluid tight relationship wherein one of the first and second mechanisms provides a source of fluid pressure and the other a fluid pressure destination, the coupling comprising:

(a) a hollow body member having first and second ends and defining a fluid passageway interconnecting the first and second ends to enable the flow of fluid therethrough, the hollow body member having a wall portion with an interior surface defining a first chamber proximate the first end with an inside diameter sized to slideably receive the first mechanism, the hollow body member including at least one aperture extending through the wall portion and in communication with the first chamber;

(b) a gripping mechanism being disposed in the first chamber proximate the first end, the gripping mechanism being actuable between a first actuated state wherein the gripping mechanism grips the first mechanism and a second non-actuated state wherein the gripping mechanism does not grip the first mechanism;

(c) a cylindrical seal member disposed in the first chamber proximate the first end, said seal member being selectively positioned between a first sealing state and a second non-sealing state;

(d) an actuator means for selectively actuating the gripping mechanism between the actuated state and the non-actuated state, comprising:

(i) an actuator member disposed within the first chamber and axially slideable between a first position actuating the gripping mechanism and a second position nonactuating the gripping mechanism, the actuator member having an inner surface and an exterior surface;

(ii) biasing means for biasing the actuator member toward the first position;

(iii) a ball member;

(iv) a sleeve member axially slideable between a first and second position and having an inner surface and an exterior surface, the sleeve member being externally mounted on the wall portion of the body member defining the first chamber and cooperating with the actuator member to retain the ball member at least partially in the aperture defined in the wall portion between the inner surface of the sleeve member and the exterior surface of the actuator member, the ball member cooperating with the biasing means and the sleeve member to selectively position the actuator member in the first and second positions, the actuator member being substantially balanced in the longitudinal direction when the fluid passageway is pressurized.

7. A coupling device according to claim 6, wherein said biasing means includes a stop means for receiving a first mechanism within said chamber; said stop means providing a generally stationary abutting surface in contact with said first mechanism.

8. A coupling device according to claim 7 wherein the second mechanism is threadably attached to said body member second end.

9. A coupling device according to claim 7 wherein said biasing means includes:
(a) a spring mechanism biasing means longitudinally disposed within the body member chamber, the spring mechanism providing an inner spring constructed and designed to abut the first mechanism inserted in the body member first end, and the spring mechanism having an outer spring which provides a biasing force to the gripping mechanism within the body member chamber.

10. A coupling device according to claim 9 wherein: said inner spring and said outer spring are constructed and arranged to form a single spring mechanism; said single spring mechanism functioning as a double-acting spring.

11. A coupling device according to claim 7 wherein said sleeve member includes a first face oriented in a plane substantially parallel to the portion of the body member defining the first chamber, and a second face constructed and arranged in a plane intersecting the plane of the first face.

12. A coupling device according to claim 9 wherein said actuator member includes first and second ends with:
(a) a notched portion therebetween; said notched portion constructed and arranged for receipt and discharge of said ball member.

13. A coupling device according to claim 6 comprising an actuator sealing portion providing a fluid-tight seal located between said actuator member and said body member chamber wall, near said body member second end; said actuator sealing portion including at least one annular elastomeric seal circumferentially surrounding said actuator member.

14. A coupling device according to claim 13 wherein said actuator sealing portion further comprises:
(a) two annular elastomeric seals;
(b) means for lubricating the chamber wall portion and the actuator member exterior surface located between said actuator sealing portion annular elastomeric seals.

15. A coupling device according to claim 14 wherein said actuator sealing portion comprises:
(a) an annular elastomeric leading seal;
(b) an annular elastomeric following seal;
(c) a reservoir of lubricating material located within a cavity between said leading seal and said following seal; so that when said actuator member moves axially within said coupling device chamber toward said coupling device first end, said leading seal urges said lubricating material into contact with said chamber wall portion and said actuator member exterior surface located between said leading seal and said following seal;
(d) whereby axial movement of said actuator member within said coupling device chamber is facilitated by said lubricating material.

16. A coupling device according to claim 15 wherein:
(a) said annular elastomeric leading seal is positioned in a first groove on said actuator member;
(b) said annular elastomeric following seal is positioned in a first groove on said actuator member;
(c) said reservoir of lubricating material is located within said first groove.

17. A coupling device used in selectively coupling a first mechanism to a second mechanism in a fluid tight relationship wherein one of the first and second mechanisms provides a source of fluid pressure and the other a fluid pressure destination, the coupling device comprising:
(a) a hollow body member having first and second ends and defining a fluid passageway interconnecting the first and second ends to enable the flow of fluid therethrough, the hollow body member having a wall portion with an interior surface defining a first chamber proximate the first end with an inside diameter sized to slideably receive the first mechanism, the hollow body member including at least one aperture extending through the wall portion and in communication with the first chamber;
(b) a gripping mechanism being disposed in the first chamber proximate the first end, the gripping mechanism being actuable between a first actuated state wherein the gripping mechanism grips the first mechanism and a second non-actuated state wherein the gripping mechanism does not grip the first mechanism, the gripping mechanism comprising;

(i) a collet having a first side for gripping the first mechanism, the first side having an indented portion with a spring ring therein, a second side having a ramped shape and being substantially opposite the first side; and a third side facing away from the body member first end;

(ii) an annular elastomeric seal constructed and arranged to selectably provide gripping and sealing force to the first mechanism inserted in said body member first end;

(iii) an annular washer disposed between said collet and said annular elastomeric seal, the annular washer providing shaping means for said annular elastomeric seal, and transfer means for an initial biasing force between said annular elastomeric seal and said collet when the gripping mechanism is placed in the actuated position;

(c) an actuator mechanism comprising:

(i) an actuator member which is annular in shape and longitudinally disposed within said body member chamber, the actuator member being slideable between a first position actuating the gripping mechanism and a second position deactuating the gripping mechanism, the actuator member being substantially balanced in the longitudinal direction when the body member chamber fluid passageway is pressurized;

(ii) an actuator sealing portion located between the actuator member and the body member wall portion proximate the body member second end; said actuator sealing portion including:

(a) an annular elastomeric leading seal positioned in a first groove;

(b) an annular elastomeric following seal positioned in a second groove;

(c) a reservoir of lubricating material located within said first groove and between said leading seal and said following seal; so that when said actuator member moves axially within said coupling device chamber toward said coupling device first end, said leading seal urges said lubricating material into contact with said chamber wall portion and said actuator member exterior surface located between said leading seal and said following seal, thereby facilitating such movement; and so that said actuator sealing portion provides a fluid-tight seal between said chamber wall and said actuator member;

(iii) a ball member;

(d) a spring mechanism biasing means longitudinally disposed within the body member chamber, the spring mechanism providing an inner spring constructed and designed to abut the first mechanism inserted in the body member first end in a substantially stationary position, and the spring mechanism having an outer spring which provides a biasing force to the gripping mechanism within the body member chamber;

(e) a sleeve member axially slideable between a first and second position and having an inner surface and an exterior surface, the sleeve member being externally mounted on the wall portion of the body member defining the first chamber and cooperating with the actuator member to retain the ball member at least partially in the aperture defined in the wall portion between the sleeve member and the actuator member, the ball member cooperating with the spring mechanism biasing means and the sleeve member to selectively position the actuator member in the first and second positions;

(f) whereby the coupling device in a first actuated state provides gripping and sealing engagement of the first mechanism inserted within the body member first end with substantially radially oriented gripping force; and (g) whereby the coupling device may be positioned from an actuated state to a non-actuated state when the body member chamber is pressurized.

18. A coupling device according to claim 17 wherein the second mechanism is threadably attached to said body member second end.

19. A coupling device according to claim 17 wherein: said inner spring and said outer spring are constructed and arranged to form a single spring mechanism; said single spring mechanism functioning as a double-acting spring.

20. A coupling device according to claim 17 wherein said sleeve member includes a first face oriented in a plane substantially parallel to the portion of the body member defining the first chamber, and a second face constructed and arranged in a plane intersecting the plane of the first face.

21. A coupling device according to claim 17 wherein said actuator member includes first and second ends with a notched portion therebetween, said notched portion constructed and arranged for receipt and discharge of said ball member.

22. A coupling device according to claim 17 wherein said collet spring ring provides radially directed collet opening force operable when said coupling device is in the non-actuated position and the collet opening force is greater than any collet closing force acting on said collet.

23. A coupling device according to claim 17 wherein said actuator sealing portion further includes a reservoir retaining member providing separation between said actuator sealing portion first and second grooves, said reservoir retaining member providing a means for retaining substantially all of the lubricating material reservoir within said actuator sealing portion first groove.

24. A coupling device used in selectably coupling a first mechanism to a second mechanism in a fluid tight relationship wherein one of the first and second mechanisms provides a source of fluid pressure and the other a fluid pressure destination, the coupling comprising:

(a) a hollow body member having first and second ends and defining a fluid passageway interconnecting the first and second ends to enable the flow of fluid therethrough, the hollow body member having a wall portion with an interior surface defining a first chamber proximate the first end with an inside diameter sized to slideably receive the first mechanism;

(b) a gripping mechanism being disposed in the first chamber proximate the first end, the gripping mechanism being actuable between a first actuated state wherein the gripping mechanism grips the first mechanism and a second non-actuated state wherein the gripping mechanism does not grip the first mechanism;

(c) a cylindrical seal member disposed in the first chamber proximate the first end, said seal member being selectively positioned between a first sealing state and a second non-sealing state;

(d) an actuator means for selectively actuating the gripping mechanism between the actuated state and the non-actuated state, comprising:
  (i) an actuator member disposed within the first chamber and axially slideable between a first position actuating the gripping mechanism and a second position nonactuating the gripping mechanism, the actuator member having an inner surface and an exterior surface;
  (ii) biasing means for biasing the actuator member toward the first position;
  (iii) retaining means for selectively positioning the actuator member in a first and second position;
(e) actuator sealing means providing a fluidtight seal located between said actuator member and said body member chamber wall, said actuator sealing means comprising:
  (i) an annular elastomeric leading seal circumferentially surrounding said actuator member;
  (ii) an anular elastomeric following seal circumferentially surrounding said actuator member;
  (iii) a reservoir of lubricating material located within a cavity between said leading seal and said following seal; so that when said actuator member moves axially within said coupling device chamber toward said coupling device first end, said leading seal urges said lubricating material into contact with said chamber wall portion and said actuator member exterior surface located between said leading seal and said following seal;
  (iv) whereby axial movement of said actuator member within said coupling device chamber is facilitated by said lubricating material.

25. A coupling device according to claim 24 wherein:
(a) said annular elastomeric leading seal is positioned in a first groove on said actuator member;
(b) said annular elastomeric following seal is positioned in a second groove on said actuator member; and
(c) said reservoir of lubricating material is located within said first groove.

* * * * *

UNITED STATES PATENT AND TRADEMARK OFFICE
CERTIFICATE OF CORRECTION

PATENT NO. : 4,884,830
DATED : December 5, 1989
INVENTOR(S) : Stanlee W. Meisinger It is certified that error appears in the above-identified patent and that said Letters Patent is hereby corrected as shown below:

Column 12, line 12,
  "on" should be --one--

Column 21, line 21,
  "anular" should be --annular--

Signed and Sealed this

First Day of January, 1991

Attest:

HARRY F. MANBECK, JR.

Attesting Officer   Commissioner of Patents and Trademarks